(12) United States Patent
Gottwald et al.

(10) Patent No.: US 8,306,423 B2
(45) Date of Patent: Nov. 6, 2012

(54) METHOD AND OPTICAL NETWORK COMPONENT FOR SIGNAL PROCESSING IN AN OPTICAL NETWORK AND COMMUNICATION SYSTEM

(75) Inventors: Erich Gottwald, Holzkirchen (DE); Harald Rohde, München (DE); Sylvia Smolorz, München (DE)

(73) Assignee: Nokia Siemens Networks OY, Espoo (FI)

( * ) Notice: Subject to any disclaimer, the term of this patent is extended or adjusted under 35 U.S.C. 154(b) by 415 days.

(21) Appl. No.: 12/601,715

(22) PCT Filed: Dec. 8, 2008

(86) PCT No.: PCT/EP2008/067020
§ 371 (c)(1),
(2), (4) Date: Nov. 24, 2009

(87) PCT Pub. No.: WO2010/066282
PCT Pub. Date: Jun. 17, 2010

(65) Prior Publication Data
US 2011/0076033 A1  Mar. 31, 2011

(51) Int. Cl.
*H04B 10/00* (2006.01)
(52) U.S. Cl. .......................... 398/72; 398/207
(58) Field of Classification Search .............. 398/66–72, 398/202–214
See application file for complete search history.

(56) References Cited

U.S. PATENT DOCUMENTS

| | | | | |
|---|---|---|---|---|
| 3,970,838 A * | 7/1976 | Goodwin et al. | ............. | 398/203 |
| 4,063,084 A * | 12/1977 | Goodwin et al. | ............. | 398/203 |
| 4,730,105 A * | 3/1988 | Mitschke et al. | ............. | 250/205 |
| 4,850,041 A * | 7/1989 | Roberts et al. | ................ | 398/135 |
| 5,337,056 A * | 8/1994 | Dax | ............................. | 342/128 |
| 5,400,167 A * | 3/1995 | Suemura | ....................... | 398/209 |
| 5,510,927 A * | 4/1996 | Noe | ............................. | 398/204 |
| 5,691,999 A * | 11/1997 | Ball et al. | ........................ | 372/20 |
| 5,886,803 A * | 3/1999 | Yamamoto et al. | ............. | 398/41 |
| 5,940,207 A * | 8/1999 | Weich et al. | .................... | 359/333 |
| 6,034,799 A * | 3/2000 | Hansen | ............................ | 398/1 |
| 6,081,539 A * | 6/2000 | Mattori et al. | .................. | 372/20 |
| 6,108,355 A * | 8/2000 | Zorabedian | ..................... | 372/20 |
| 6,263,004 B1 * | 7/2001 | Arvidsson et al. | ............. | 372/11 |
| 6,282,215 B1 * | 8/2001 | Zorabedian et al. | ............ | 372/20 |

(Continued)

FOREIGN PATENT DOCUMENTS
EP  1195927 A2  4/2002

OTHER PUBLICATIONS
International Search Report dated May 8, 2009 with Written Opinion.

(Continued)

*Primary Examiner* — Agustin Bello
(74) *Attorney, Agent, or Firm* — Laurence A. Greenberg; Werner H. Stemer; Ralph E. Locher

(57) ABSTRACT

A method and an optical network component for data processing in an optical network. A first signal and a second signal are influenced by a tunable element. The first signal is an incoming optical signal, and the second signal is a local oscillator signal generated by a laser. The laser has an optical gain element that is tuned by the tunable element. A communication system is provided with the optical network component.

21 Claims, 2 Drawing Sheets

U.S. PATENT DOCUMENTS

| | | | |
|---|---|---|---|
| 6,317,252 B1 * | 11/2001 | Vahala et al. | 359/326 |
| 6,470,036 B1 * | 10/2002 | Bailey et al. | 372/20 |
| 6,532,091 B1 * | 3/2003 | Miyazaki et al. | 398/175 |
| 6,600,760 B1 * | 7/2003 | Green et al. | 372/20 |
| 6,888,856 B2 * | 5/2005 | Green et al. | 372/20 |
| 6,996,138 B2 * | 2/2006 | Jung et al. | 372/18 |
| 7,027,743 B1 | 4/2006 | Tucker et al. | |
| 7,034,989 B2 * | 4/2006 | Yoo et al. | 359/326 |
| 7,068,944 B2 * | 6/2006 | Sorin | 398/152 |
| 7,106,974 B2 * | 9/2006 | Lee et al. | 398/168 |
| 7,120,176 B2 * | 10/2006 | McDonald et al. | 372/29.02 |
| 7,149,431 B2 * | 12/2006 | Jung et al. | 398/138 |
| 7,209,609 B2 * | 4/2007 | Shin et al. | 385/24 |
| 7,340,173 B2 * | 3/2008 | Shin et al. | 398/79 |
| 7,349,631 B2 * | 3/2008 | Lee et al. | 398/82 |
| 7,471,899 B2 * | 12/2008 | Kim et al. | 398/69 |
| 7,532,821 B2 * | 5/2009 | Lee et al. | 398/155 |
| 7,539,416 B2 * | 5/2009 | Kim et al. | 398/70 |
| 7,577,370 B2 * | 8/2009 | Lee et al. | 398/203 |
| 7,596,319 B2 * | 9/2009 | Park et al. | 398/72 |
| 7,680,416 B2 * | 3/2010 | Hann et al. | 398/85 |
| 7,903,979 B2 * | 3/2011 | Lee et al. | 398/168 |
| 7,933,520 B2 * | 4/2011 | Youn et al. | 398/95 |
| 7,944,960 B2 * | 5/2011 | Sorin et al. | 372/50.12 |
| 7,978,976 B2 * | 7/2011 | Pohjola et al. | 398/72 |
| 8,086,102 B2 * | 12/2011 | Kim et al. | 398/67 |
| 2001/0004290 A1 * | 6/2001 | Lee et al. | 359/124 |
| 2001/0038481 A1 * | 11/2001 | Li et al. | 359/158 |
| 2002/0181833 A1 * | 12/2002 | Berger | 385/15 |
| 2003/0231382 A1 * | 12/2003 | Ahn et al. | 359/344 |
| 2004/0008991 A1 * | 1/2004 | Waarts et al. | 398/81 |
| 2004/0184491 A1 * | 9/2004 | Wai et al. | 372/27 |
| 2005/0088724 A1 * | 4/2005 | Lee et al. | 359/333 |
| 2006/0120733 A1 * | 6/2006 | Tucker et al. | 398/204 |
| 2007/0086784 A1 * | 4/2007 | Lee et al. | 398/152 |
| 2010/0214651 A1 * | 8/2010 | Kim et al. | 359/344 |
| 2011/0076033 A1 * | 3/2011 | Gottwald et al. | 398/208 |
| 2011/0200333 A1 * | 8/2011 | Schrenk et al. | 398/67 |

OTHER PUBLICATIONS

Davis, et al: "Filling up the Fibre-Experimental Work Towards Optical Coherent Multichannel Systems", XP006517637, Jan. 1989, pp. 88-93.

Debney et al: "The Application of Optical Coherent Multichannel Techniques to Future Broadband Networks", XP006519131, Jan. 1990, pp. 264-269.

Fujiwarma et al: "A Coherent Photonic Wavelength-Division Switching System for Broadband Networks", XP006518209, Jan. 1988, pp. 139-142.

* cited by examiner

METHOD AND OPTICAL NETWORK COMPONENT FOR SIGNAL PROCESSING IN AN OPTICAL NETWORK AND COMMUNICATION SYSTEM

BACKGROUND OF THE INVENTION

Field of the Invention

The invention relates to a method and to an optical network component for data processing in an optical network and to a communication system comprising such optical network component.

A passive optical network (PON) is a promising approach regarding fiber-to-the-home (FTTH), fiber-to-the-business (FTTB) and fiber-to-the-curb (FTTC) scenarios, in particular as it overcomes the economic limitations of traditional point-to-point solutions.

The PON has been standardized and it is currently being deptoyed by network service providers worldwide. Conventional PONS distribute downstream traffic from the optical line terminal (OLT) to optical network units (ONUs) in a broadcast manner while the ONUs send upstream data packets multiplexed in time to the OLT. Hence, communication among the ONUs needs to be conveyed through the OLT involving electronic processing such as buffering and/or scheduling, which results in latency and degrades the throughput of the network.

In fiber-optic communications, wavelength-division multiplexing (WDM) is a technology which multiplexes multiple optical carrier signals on a single optical fiber by using different wavelengths (colors) of laser light to carry different signals. This allows for a multiplication in capacity, in addition to enabling bidirectional communications over one strand of fiber.

WDM systems are divided into different wavelength patterns, conventional or coarse and dense WDM. WDM systems provide, e.g., up to 16 channels in the 3rd transmission window (Cband) of silica fibers around 1550 nm. Dense WDM uses the same transmission window but with denser channel spacing. Channel plans vary, but a typical system may use 40 channels at 100 GHz spacing or 80 channels with 50 GHz spacing. Some technologies are capable of 25 GHz spacing. Amplification options enable the extension of the usable wavelengths to the L-band, more or less doubling these numbers.

Optical access networks, e.g., a coherent Ultra-Dense Wavelength Division Multiplex (UDWDM) network, are deemed to be the future data access technology.

Within the UDWDM concept, potentially all wavelengths are routed to each ONU. The respective wavelength is selected by the tuning of the local oscillator (LO) laser at the ONU. Other wavelengths also arriving at the ONT result in an optical offset and increase the noise of the signal to be detected. A sufficiently strong LO renders the contributions of such other wavelengths minor compared to the signal itself.

The problem to be solved is to overcome the disadvantages as described above and in particular to allow for an efficient optical signal processing.

BRIEF SUMMARY OF THE INVENTION

This problem is solved according to the features of the independent claims. Further embodiments result from the depending claims.

In order to overcome this problem, a method for signal processing in an optical network is provided, receiving a first optical signal in form of a data signal by a tunable filter and
providing a selected first optical signal having a required wavelength;
providing an allocated second optical signal as a local oscillator signal generated by a laser; determining a wavelength of the second optical signal by the tunable filter as a component of the laser and directly adjusting the laser, and
tuning said selecting first optical signal and tuning said second optical signal simultaneously by setting said tunable filter.

In a next embodiment, the tunable filter is reflecting the selected first optical signal and reflecting the second optical signal being a component of the laser.

In a further embodiment, the selected first optical signal is passing the tunable filter and the second optical signal is passing the tunable filter being a component of the laser.

In another embodiment, the tunable filter is a dielectric filter.

Hence, contributions of the other wavelengths arriving at an optical network element, e.g., an ONU or an OLT, could be efficiently suppressed thereby increasing both the receiver's sensitivity and the signal-to-noise ratio.

In another embodiment, the tunable filter is an angle-tunable filter.

The tunable filter may in particular be a mechanical and/or electrical component influencing the first signal and the second signal via a single adjustment.

Pursuant to another embodiment, the first signal and the second signal are conveyed via waveguides, wherein said waveguides are offset to each other.

In case the waveguides are arranged offset to one another, e.g., crosstalk can be efficiently reduced or avoided.

According to an embodiment, said tunable element provides a mechanical and/or an electrical coupling for tuning the selected first optical signal and the second optical signal.

In particular, a single adjustment of the tunable element has an impact on the first signal and on the second signal.

According to another embodiment, said method is processed in an optical network element, in particular in an ONU and/or in an OLT.

Another embodiment comprises combining the selected first optical signal with the second optical signal for coherent demodulation.

This efficiently allows coherent reception in particular within an OLT or an ONU.

The problem stated above is also solved by an optical network component comprising
a tunable filter receiving a first optical signal in form of a data signal and providing a selected first optical signal having a required wavelength;
an adjustable laser providing an allocated second optical signal as a local oscillator signal;
the laser comprising a gain element and also said tunable filter as a laser component determining a wavelength of the second optical signal; and
the tunable filter being configured for tuning simultaneously said selected first optical signal and said second optical signal.

According to an embodiment, wherein said tunable filter is configured to tune simultaneously the first optical signal and the second optical signal via mechanical and/or electrical coupling.

According to an embodiment, wherein the selected first optical signal is reflected by the tunable filter and the second optical signal is reflected by the tunable filter as a component of the laser.

According to another embodiment, wherein the selected first optical signal is passing the tunable filter and the second optical signal is passing the tunable filter being a component of the laser.

Both versions, mirror or bandpass, of the tunable optical filter are possible.

According to another embodiment, said tunable filter is an angle-tunable dielectric filter.

According to another embodiment, the optical component is configured as a component of an optical network unit or of an optical line terminal.

The problem stated supra is further solved by a communication system comprising the optical network component as described herein.

Embodiments of the invention are shown and illustrated in the following figures:

The approach provided herein enables a tunable element of an optical component to be used for filtering purposes.

Said tunable element may in particular be or comprise a dielectric filter that determines the wavelength of a local oscillator (LO).

DESCRIPTION OF THE INVENTION

Figure 1:
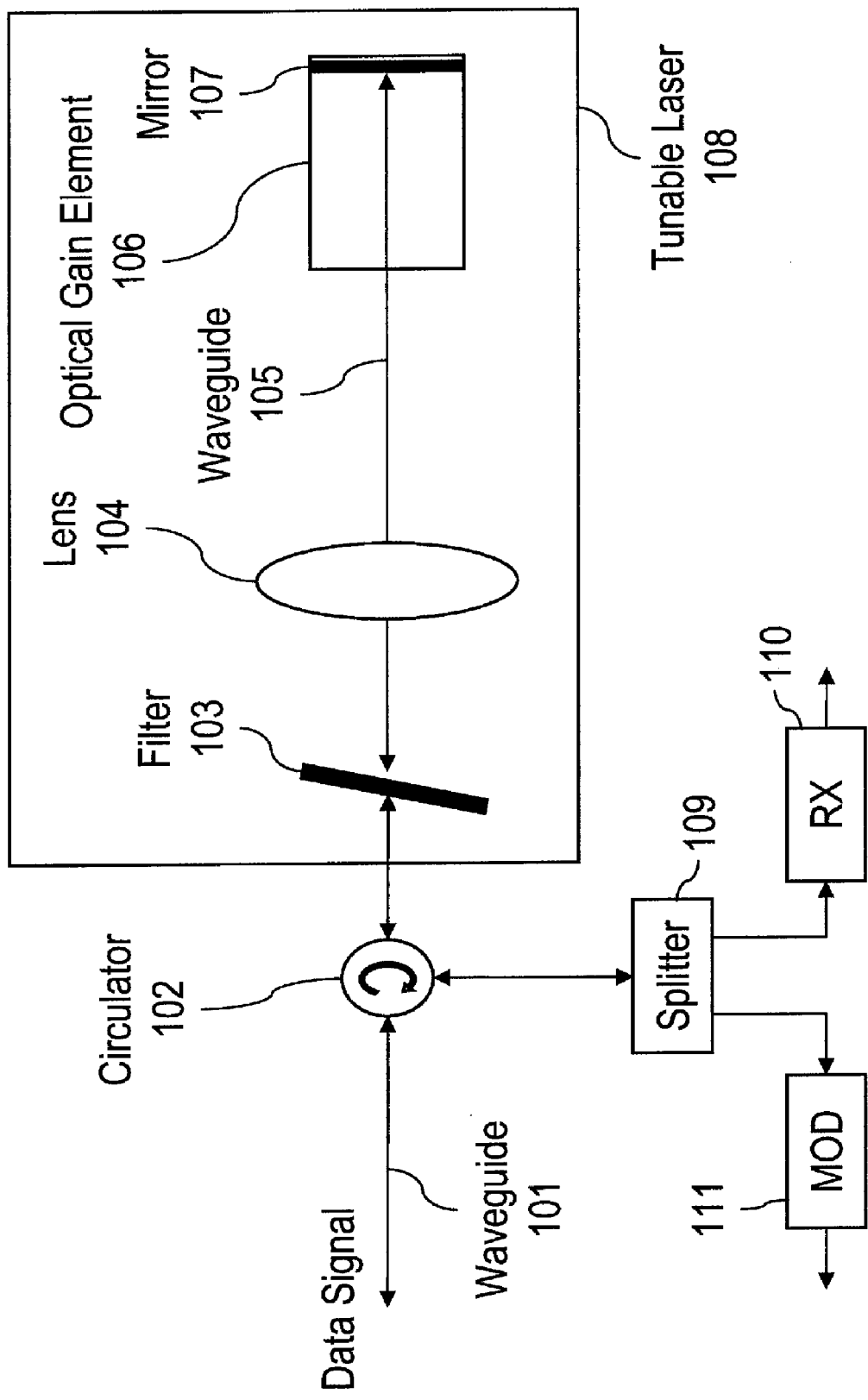
FIG. 1 shows a diagram depicting the basic principle of a filter that has an impact on an incoming data signal as well as on a local oscillator signal provided by a laser.

FIG. 1 shows an optical gain element 106 (e.g., a laser active medium) providing an optical signal via a waveguide 105 and a lens 104 to a filter 103, which is in particular an angle-tunable dielectric filter. The combination of said filter 103 and the optical gain element 106 comprising a mirror 107 constitutes a tunable laser 108, i.e. the tunable laser 108 can be adjusted via said filter 103.

On the other hand, a data signal is conveyed via a waveguide 101 to a circulator 102, which feeds the data signal towards the filter 103 and the reflection or signal provided by the filter 103 to a splitter 109. The splitter 109 supplies its input signal to a modulator 111 and further via a fiber (not shown) to a remote receiver as well as to a local receiver 110 for further processing purposes.

Hence the filter 103 has an impact on the data signal conveyed via the circulator 102 as well as on the signal provided by the optical gain element 106.

The filter 103 may serve as a mirror for the laser 106 and the back side of the filter 103 may serve as a mirror for the data signal.

The filter 103 may provide a physical impact due to its positioning to both, the LO signal as well as the data signal.

Hence, the filter 103 can be used for selecting and/or adjusting the wavelength of the LO as well as it can be used for filtering the incoming data signal. In particular, the signal wavelength required (including, e.g., some (few) neighboring channels) is reflected by said filter 103.

In case the tunable laser 108 is adjusted by moving the angle of the filter 103, the data signal as well as the LO signal provided by the tunable laser 108 are adjusted accordingly, i.e. dependent on such movement or position of the filter 103.

Advantageously, the wavelength of the data signal and the wavelength of the laser signal (LO signal) can be automatically aligned by said filter without any need for additional elements or components.

In case the incoming data signal is too strong and the wavelength passing the filter 103 may have an impact on the optical gain element 106, the signal waveguide 101 and the laser waveguide 105 could be arranged in a slightly offset way to avoid such effect. In addition, cross-talk could be reduced or avoided by such offset arrangement of the waveguides 101 and 105.

It is a further advantage that an integrated photonic circuit can be used thus gaining receiver sensitivity.

The arrangement shown in FIG. 1 can be provided with an optical network component, e.g., with an OLT or an ONU.

Figure 2:
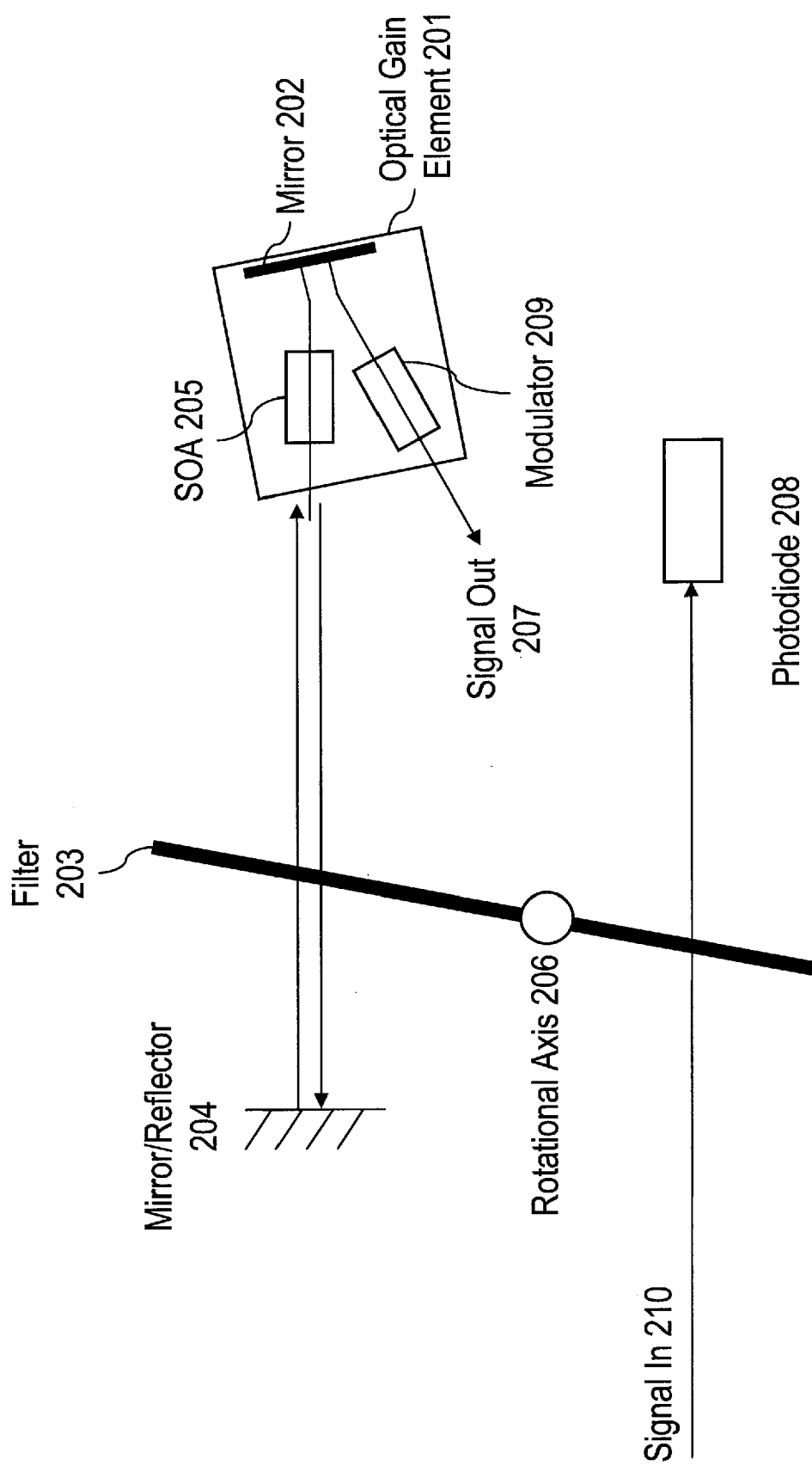
FIG. 2 shows an alternative embodiment as how an incoming and an outgoing signal may be influenced by a single tunable element, e.g., a filter.

FIG. 2 shows an exemplary arrangement as how an incoming and an outgoing signal may be influenced by a single tunable element, e.g., a filter.

An optical gain element 201 comprises a Semiconductor Optical Amplifier (SOA) 205 via which a signal is being conveyed towards a filter 203 and reflected by a mirror (or reflector) 204 back to the optical gain element 201. Hence, the filter 203 can be used to adjust a wavelength of a laser. The optical gain element 201 comprises a mirror 202 that is used to reflect the incoming signal from the filter 203 to be modulated by a modulator 209 and provided as an output signal "Signal Out" 207.

It is noted that the optical gain element may be a laser diode comprising an anti-reflection coating.

In addition, an input signal (data signal, "Signal In" 210) can be fed via the filter 203 to a photodiode 208.

The filter 203 may be realized as a mechanical component comprising a rotational axis 206 such that the impact to the signal generated by the laser 201 and the input signal corresponds to the positioning or movement of said filter.

The filter 203 can be adjusted by a piezo-electric actuator, e.g. a motor or the like.

Furthermore, the signal conveyed from the optical gain element 201 towards the mirror 204 may in addition be utilized and/or combined with the input signal "Signal In" 210 to allow for a coherent reception.

LIST Of ABBREVIATIONS

OLT Optical Line Terminal
ONU Optical Network Unit
PD Photo Diode
PON Passive Optical Network
SOA Semiconductor Optical Amplifier
UDWDM Ultra Dense WDM
WDM Wavelength Division Multiplex

The invention claimed is:

1. A method of signal processing in an optical network, which comprises the following steps:
   receiving a first optical signal in the form of a data signal by a tunable filter;
   providing a selected first optical signal having a required wavelength;
   providing an allocated second optical signal as a local oscillator signal generated by a laser;
   determining a wavelength of the second optical signal by the tunable filter as a component of the laser and directly adjusting said laser; and tuning said selected first optical signal and tuning said second optical signal simultaneously by setting said tunable filter.

2. The method according to claim 1, wherein the selected first optical signal is reflected by the tunable filter and the second optical signal is reflected by the tunable filter as a component of the laser.

3. The method according to claim 1, wherein the selected first optical signal is passing the tunable filter and the second optical signal is passing the tunable filter being a component of the laser.

4. The method according to claim 2, wherein the tunable element is a dielectric filter.

5. The method according to claim 3, wherein the tunable element is a dielectric filter.

6. The method according to claim 2, wherein the tunable filter is an angle-tunable filter.

7. The method according to claim 2, which comprises conveying the first optical signal and the second optical signal via waveguides, wherein the waveguides are offset to each other.

8. The method according to claim 2, wherein said tunable filter comprises a mechanical and/or an electrical coupling for tuning the selected first optical signal and the second optical signal.

9. The method according to claim 3, wherein said tunable filter comprises a mechanical and/or an electrical coupling for tuning the selected first optical signal and the second optical signal.

10. The method according to claim 1, which comprises combining the selected first optical signal with the second optical signal for coherent demodulation.

11. The method according to claim 1, which comprises carrying out the method steps in an optical network element.

12. The method according to claim 11, wherein
the optical network element is at least one of an optical network unit and an optical line terminal.

13. An optical network component, comprising:
a tunable filter receiving a first optical signal in the form of a data signal and providing a selected first optical signal having a required wavelength;
an adjustable laser providing an allocated second optical signal as a local oscillator signal;
the laser comprising a gain element and also said tunable filter as a laser component determining a wavelength of the second optical signal; and
the tunable filter being configured for tuning simultaneously said selected first optical signal and said second optical signal.

14. The optical network component according to claim 13, wherein said tunable filter is configured to tune simultaneously the selected first optical and the second optical signal via mechanical and/or electrical coupling.

15. The optical network component according to claim 13, wherein
the tunable filter is reflecting the selected first optical signal and
is a component of the laser reflecting the second optical signal.

16. The optical network component according to claim 13, wherein
the tunable filter lets the selected first optical signal pass and
as a component of the laser lets the second optical signal pass.

17. The optical network component according to claim 14, wherein said tunable filter is an angle-tunable dielectric filter.

18. The optical network component according to claim 15, wherein said tunable filter is an angle-tunable dielectric filter.

19. The optical network component according to claim 16, wherein said tunable filter is an angle-tunable dielectric filter.

20. The optical network component according to claim 13, configured as a component of an optical network unit or as an optical line terminal.

21. A communication system, comprising the optical network component according claim 13.

* * * * *